United States Patent [19]

Lee

[11] 4,108,943

[45] Aug. 22, 1978

[54] RUBBER MODIFIED FIRE RETARDANT POLYMER COMPOSITIONS

[75] Inventor: Yoon C. Lee, Springfield, Mass.

[73] Assignee: Monsanto Company, St. Louis, Mo.

[21] Appl. No.: 812,557

[22] Filed: Jul. 5, 1977

Related U.S. Application Data

[63] Continuation-in-part of Ser. No. 644,492, Dec. 29, 1975, Pat. No. 4,048,263.

[51] Int. Cl.$^2$ .............................................. C08L 23/00
[52] U.S. Cl. ........................... 260/878 R; 260/45.7 R; 260/45.75 B; 260/45.75 D; 260/45.75 F; 260/45.75 K; 260/45.75 R; 260/879; 260/884; 260/890; 260/892; 260/897 B; 260/899
[58] Field of Search .................. 260/878 R, 879, 884, 260/890, 899, 45.75 B, 4, 892, 897 B, 45.7 RL, 45.7 R, 45.75 D, 45.75 F, 45.75 K, 45.75 R

[56] References Cited

U.S. PATENT DOCUMENTS

| 2,894,926 | 7/1959 | Jacobson | 260/890 |
|---|---|---|---|
| 3,162,613 | 12/1964 | Tousignant | 260/45.7 R |
| 3,326,832 | 6/1967 | Rauschenbach et al. | 260/890 X |
| 3,639,298 | 2/1972 | Lister et al. | 260/45.7 R |
| 3,641,212 | 2/1972 | Narayana et al. | 260/893 |
| 3,700,650 | 10/1972 | Hani et al. | 260/890 |
| 3,723,139 | 3/1973 | Larkin et al. | 260/45.75 R |
| 3,869,420 | 3/1975 | Mathis et al. | 260/45.7 R X |
| 3,998,783 | 12/1976 | Whelan, Jr. | 260/45.75 A |
| 4,028,335 | 6/1977 | Fox | 260/45.75 B |

FOREIGN PATENT DOCUMENTS

1,402,958   8/1975   United Kingdom .................... 260/293

*Primary Examiner*—Paul Lieberman
*Attorney, Agent, or Firm*—W. J. Farrington; J. C. Logomasini; S. M. Tarter

[57] ABSTRACT

Disclosed herein are rubber modified fire retardant polymer compositions based on interpolymers of styrene, maleic anhydride, a brominated monomer such as tribromophenyl acrylate and a rubber component, which have been formulated with various additives. These compositions, which have a UL-94 rating of at least V-1, are especially useful for use in radio and T.V. cabinets, furniture, appliance housings and other similar applications.

10 Claims, No Drawings

RUBBER MODIFIED FIRE RETARDANT POLYMER COMPOSITIONS

RUBBER MODIFIED FIRE RETARDANT POLYMER COMPOSITIONS

This application is a continuation-in-part of application Ser. No. 644,492, now U.S. Pat. No. 4,048,263, which was filed on Dec. 29, 1975 and which issued on Sept. 13, 1977.

BACKGROUND OF THE INVENTION

1. Field of the Invention

The present invention relates to rubber modified fire retardant polymer compositions comprising an interpolymer of styrene, maleic anhydride and a copolymerizable brominated comonomer such as tribromophenyl acrylate, which have been formulated with a halogenated fire retardant additive, a metal oxide and a smoke suppressant.

2. Description of the Prior Art

Polystyrene (PS) and styrene-acrylonitrile copolymers (S/AN) are well known and are widely used in the prior art. Polymers which are prepared using a comonomer such as maleic anhydride with the styrene and styrene-acrylonitrile polymers are also known in the art. These polymers tend to burn readily and are not generally recommended for use in those applications requiring fire retardant polymers.

There exists a need in the art for rubber modified styrene-maleic anhydride based molding compositions which can be made fire retardant. This need is accented by the increasing number of laws and regulations relating to the fire retardant properties of polymers used as molding compositions in the manufacture of furniture, such as radio and television cabinets, tables, chairs, appliance housings, and other related uses.

SUMMARY OF THE PRESENT INVENTION

The above need in the prior art is fulfilled by a molding polymeric composition comprising:
(a) from 48 to 94 percent by weight based on the total weight of the molding composition of a rubber modified polymer which is the product of polymerizing:
   (1) from 55 to 85 percent by weight of a styrene monomer;
   (2) from 5 to 25 percent by weight of a maleic anhydride monomer; and
   (3) from 10 to 20 percent by weight of a brominated monomer selected from the group consisting of bromophenyl acrylates, bromophenyl methacrylates, bromoneopentyl acrylate and bromoneopentyl methacrylates with the proviso that the amount of bromine in the polymer is at least 6 percent by weight in the presence of
   (4) from 1 to 30 percent by weight of a graftable rubber substrate;
(b) from 3 to 12 percent by weight based on the total weight of the molding composition of a metal oxide;
(c) from 3 to 25 percent by weight based on the total weight of the molding composition of a smoke suppressant which is selected from the group consisting of smoke suppressing hydrates, carbonates and borates; and
(d) from 0 to 15 percent by weight of a brominated aromatic fire retardant additive.

The polymeric component of the composition of the invention comprises a matrix polymer with grafted rubber dispersed therein. The superstrate grafted on to the rubber has approximately the same composition as the matrix polymer and is formed by graftingof monomeric components on to the rubber substrate.

DESCRIPTION OF THE PREFERRED EMBODIMENTS

The styrene-type monomers used in the present invention include styrene, alpha-methylstyrene and halogenated styrenes such as o-, p- and m-chlorostyrenes, o-, p- and m-bromostyrenes, etc. The amount of styrene-type monomer used in the present invention is from 55 to 85 percent by weight based on the weight of the total polymer composition. Up to 30 percent by weight of the styrene monomer may be replaced by other suitable monomers such as acrylonitrile, methacrylonitrile, methylmethacrylate, etc.

The amount of maleic anhydride used in the present invention is in the range of from 5 to 25 percent by weight, preferably 7 to 20 percent by weight based on the total polymer composition. The maleic anhydride monomer used may be replaced in whole or in part by monochloromaleic anhydride and monobromomaleic anhydride. The dichloromaleic anhydride was found to be unsuitable because of excessive brittleness in the polymer which also had poor processability. The maleic anhydride monomers used contribute to lower smoke levels for the polymer, raise the heat distortion temperature of the polymer and reduce the tendency of the polymer to drip during the flame tests.

The brominated comonomers which are copolymerized with styrene and maleic anhydride include brominated phenyl acrylates, brominated phenyl methacrylates, brominated neopentyl acrylates and brominated neopentyl methacrylates wherein the monomer contains from 1 to 5 bromine atoms per molecule. The preferred brominated monomers include tribromophenyl acrylate, tribromophenyl methacrylate, tribromoneopentyl acrylate and tribromoneopentyl methacrylate.

The amount of brominated monomer used is selected so as to provide an interpolymer with a bromine content of at least 6 percent by weight. In order to obtain this minimum bromine level, it will be necessary to use brominated monomer in amounts in the range of from 10 to 25 percent, preferably 10 to 20 percent, by weight, when using the preferred tribromo monomers. Preferably, the total amount of halogen in molding compositions prepared from the interpolymers of the present invention is at least 10 percent by weight. This amount of halogen can be due solely to the brominated monomers used. Alternately, at least 6 percent by weight of the halogen can be due to the brominated monomers used and the balance can be contributed by halogenated fire retardant additives or halogenated rubber modifiers as is described in greater detail below.

The use of a brominated comonomer insures dispersion of the bromine throughout the polymer composition and avoids the problems encountered when trying to obtain a uniform dispersion of fire retardant additives into the polymer composition. Moreover, when using the comonomer approach there is more latitude for the use of additives in the polymer for specific purposes without losing too much of the polymer properties.

The polymers of the present invention are prepared by conventional mass or solution polymerization techniques. Aqueous polymerization methods are not suitable because the water would hydrolyze the anhydride group.

The polymers of the present invention may be further modified with various additives in order to enhance fire retardant properties and/or smoke evolution properties. A description of the preferred additives is set forth below.

HALOGEN ADDITIVES

The polymers of the present invention may be formulated with additives which provide additional halogen content to the polymer composition. These halogenated fire retardant additives are generally well known in the art. The preferred additives are those which contain one or more bromine atoms attached to an aromatic nucleus. One such class of these compounds may be represented by the following general formula:

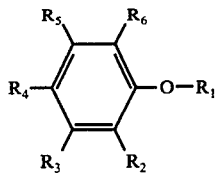

in which $R_1$ is an aromatic group which may be brominated and/or chlorinated or a straight chain or branched alkyl group containing from 2 to 12 carbon atoms and may contain an OH group, and $R_2$ to $R_6$ each represent a member of the group consisting of hydrogen, chlorine and bromine; said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether and decabromodiphenyl ether. The halogen atoms of these diaromatic ethers may be distributed in any arrangement on the aromatic rings.

Examples of suitable aromatic-aliphatic ethers are the 2-ethylhexyl-, n-octyl, nonyl-, butyl-, dodecyl- and 2,3-dioxypropyl ethers of tribromophenyl, tribromochlorophenyl and tribromodichlorophenyl. The most preferred compound is decabromodiphenyl ether.

Other aromatic bromine compounds are described in U.S. Pat. Nos. 3,833,538, 3,849,369, British Pat. No. 1,372,120 and West German Patent Publications Nos. 2,328,517, 2,328,520 and 2,328,535 which are incorporated herein by reference. Other suitable aromatic bromine compounds are well known to those skilled in the art or will become obvious upon reading the present specification.

The amount of halogenated fire retardant additives is in the range of from 0 to 15 percent by weight, preferably 4 to 12 percent by weight in order to provide additional halogen to the compositions.

SYNERGISTS

Examples of synergists used in combination with the halogen in order to obtain improved fire retardant properties include metal oxides such as $Sb_2O_3$, $Bi_2O_3$, $MoO_3$, $SnO_2$, $WO_3$, and the like. The preferred metal oxide is $Sb_2O_3$. These metal oxides (especially antimony oxide) function as synergists in improving the efficiency of the halogen in imparting flame retardancy to the above mentioned polymers. The amount of metal oxide used with the polymers of this invention will be from 1 to 15 percent by weight, preferably 3 to 12 percent by weight, based on the total weight of the formulated composition.

SMOKE SUPPRESSANTS

The polymers of the present invention may be further modified with smoke suppressants in order to enhance fire retardant properties and/or smoke evolution properties. Examples of smoke suppressants would include hydrates, carbonates and borates such as alumina trihydrate, aluminum hydroxide sodium carbonate hydrate, magnesium carbonate, hydrated magnesia, hydrated calcium silicate, hydrated calcium borate, calcium carbonate, and magnesium borate. One of the preferred smoke suppressants is dawsonite $[NaAl\ CO_3(OH)_2]$ which is available commercially from Alcoa. Mixtures of the above smoke suppressants are also effective. The amount of smoke suppressant used in this invention will be from 3 to 25 percent by weight, preferably from 5 to 20 percent by weight based on the total weight of the formulated composition.

In addition to acting as smoke suppressants, the magnesium carbonate and/or magnesium borate are also believed to react with the sodium oxide generated by the dawsonite thereby keeping the sodium oxide from reacting with and tying up the fire retarding halogens. Thus, when using small amounts of the carbonate or borate, e.g., from 3 to 15 percent by weight based on the formulated composition, in combination with the dawsonite, more of the halogen in the composition will be more readily available to function as a flame retardant. Alternately, when using dawsonite and other such compounds, one can increase the amount of halogen used in order to compensate for that which may be tied up by the dawsonite.

The preferred smoke suppressant system is a combination of magnesium carbonate and dawsonite wherein the ratio of magnesium carbonate to dawsonite is at least 1:1.

RUBBER MODIFIERS

The interpolymerization products of the present invention contain from 1 to 30 percent and more preferably from 5 to 20 percent by weight of a synthetic or natural rubber component. Examples of the rubber components include polymers and copolymers of butadiene, isoprene, chloroprene, as well as other rubbers such as nitrile rubbers, epichlorohydrin rubbers, acrylate rubbers, natural rubbers and rubbery ethylene-vinyl acetate, ethylene-propylene copolymers and chlorinated polyethylene. The rubber component strengthens or toughens the interpolymer of styrene/maleic anhydride and the brominated comonomer. The percent rubber referred to above is that of the rubber substrate based on the total polymer composition.

The preferred rubber components are epichlorohydrin rubbers, polychloroprene rubbers and chlorinated polyethylene.

The polychloroprene rubber component which may be used in the present invention is polychloroprene or a copolymer of chloroprene and at least one other monomer such as butadiene, acrylonitrile, methacrylonitrile, styrene, ring substituted halostyrene, alpha-halostyrene, ring substituted alkylstyrene, alpha-alkylstyrene, vinyl chloride, etc. The amount of comonomer used is in the range of 0 to 20 percent based on the weight of polychloroprene rubber copolymer. The chloroprene rubber may be crosslinked either before or during processing in order to maintain its particulate nature.

The preferred rubbers are polyepichlorohydrin rubbers and copolymers of epichlorohydrin with alkylene oxides such as ethylene and propylene oxides. These rubbers are available commercially as Hydrin Elastomers from B. F. Goodrich Chemical Company.

The percent of monomer grafted onto the rubber is in the range of from about 10 to 100 percent by weight with 10 to 50 percent being most preferred to insure compatibility and good gloss. The percent graft is defined as the weight percent of monomers grafted onto the rubber particle, based on the weight of the rubber, e.g., 100 grams of rubber grafted with 100 grams of monomer has 100 percent of grafted monomers. Preferably, the grafted rubber has a particle size in the range of from 0.1 to 20 microns, more preferably 1 to 10 microns for optimum gloss and toughness.

Additional quantities of rubber, which may be grafted or ungrafted, may be blended with the rubber modified polymer to modify the physical properties of the composition. Such additional rubber components can be of the same type as the rubber substrate or different. The preferred additional rubber component is usually polybutadiene or a styrene-butadiene block copolymer rubber. Any graft on the additional rubber component preferably comprises at least one of the monomers of the matrix copolymer.

TEST PROCEDURES

Underwriters Laboratory Test UL-94[1]

Fire retardant properties are measured using the "Test for Flammability for Plastic Materials — UL-94", Sept. 17, 1973. The test is carried out on test specimens 6" × ½" × ⅛". When other sample thicknesses are used the stated thickness is given.

[1]The numerical flame spread ratings reported herein are not intended to reflect hazards presented by the presently claimed polyblends or any other materials under actual fire conditions.

The test specimen is supported from the upper end, with longest dimension vertical, by a clamp on a ringstand so that the lower end of the specimen is ⅜" above the top of the burner tube. The burner is then placed remote from sample, ignited and adjusted to produce a blue flame, ¾" in height.

The test flame is placed centrally under the lower end of the test specimen and allowed to remain for 10 seconds. The test flame is then withdrawn and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds) and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus, and A. F. Robertson, "Method for Measuring Smoke from Burning Materials" Symposium on Fire Test Methods — Restraint and Smoke, 1966, ASTM STP 422, Am. Soc. Testing Mats., 1967, p. 166.

The following examples are set forth in illustration of the present invention and are not to be construed as a limitation thereof. Unless otherwise indicated, all parts and percentages are by weight.

COMPARATIVE TESTS 1 to 4 (Control)

Comparative Tests 1 to 4 illustrate the effect of various amounts of maleic anhydride on the smoke evolution in styrene-maleic anhydride copolymers during fire retardant tests. The polystyrene and styrene-maleic anhydride (SMA) copolymers tested are prepared by conventional techniques. These polymers are then formulated as follows:

| | |
|---|---|
| Polymer | 77 parts |
| Antimony Oxide | 4 parts |
| Decabromodiphenyl Oxide | 9 parts |
| Dawsonite | 5 parts |
| Magnesium Carbonate | 5 parts |
| | 100 parts |

The decabromodiphenyl oxide is a conventional fire retardant additive, which is available commercially as Dow FR-300-BA from the Dow Chemical Company. The antimony oxide is a synergist for the decabromodiphenyl oxide. The dawsonite and magnesium carbonate are smoke suppressants.

The ingredients are compounded on a mill roll at temperatures in the range of 160° to 195° C. and then compression molded into test specimens using temperatures in the range of 175° to 195° C. and pressures of about 4000 to 5000 psi (281 to 351 kg/sq.cm.). The molded specimens are then tested for flame and smoke properties using the procedures described above. The results are tabulated in Table I below.

TABLE I
SUMMARY OF COMPARATIVE TESTS 1 to 4

| Comparative Test | % Maleic Anhydride in Polymer | $Dm^{(1)}$ | UL-94 Rating | Dripping Behavior | $AFOT^{(2)}$ |
|---|---|---|---|---|---|
| 1 Polystyrene | 0 | 550(284) | Fail | Drips Heavily | 35 |
| 2 SMA | 7 | 518(226) | Fail | Drips Slightly | 35 |
| 3 SMA | 14 | 472(213) | V-O | None | 2 |

TABLE I-continued
SUMMARY OF COMPARATIVE TESTS 1 to 4

| Comparative Test | % Maleic Anhydride in Polymer | Dm[1] | UL-94 Rating | Dripping Behavior | AFOT[2] |
|---|---|---|---|---|---|
| 4 SMA | 21 | 330(162) | V-O | None | 2 |

[1]The first number is under flaming while the second number in parentheses is under non-flaming (smouldering) conditions.
[2]Approximate flame out times.

Referring to Table I above, as the amount of maleic anhydride increases from 0 to 14 percent, the UL rating and approximate flame out times (AFOT) become significantly better. In this regard the polystyrene of Test 1 and the styrene-maleic anhydride copolymer of Test 2 which contain 7 percent by weight of maleic anhydride should be compared with Tests 3 and 4 which contain 14 and 21 percent of maleic anhydride. In addition, there is less smoke evolved and less tendency for the polymer to drip when using increasing amounts of maleic anhydride.

All of the above samples contain 9 parts of a decabromodiphenyl oxide fire retardant additive, which provides 7.4 percent bromine to the composition. Even at these bromine levels Tests 1 and 2 fail the UL-94 test. However, it should be noted that when Test 1 was repeated without the dawsonite it passed the UL-94 test but dripped heavily and gave off greater amounts of smoke. Moreover, the use of halogenated fire retardant additives instead of halogenated monomers may result in non-uniform properties because of the problem of obtaining a uniform dispersion of the additives in the polymer.

EXAMPLE 1

This Example describes a process for producing a rubber modified copolymer useful in the compositions of the present invention.

A resin kettle equipped with an anchor agitator is charged with 71 parts of styrene and 10 parts of epichlorohydrin rubber, based on 100 parts of total polymerizable monomer. The mixture is heated to 50° C. with agitation to dissolve the rubber and the resulting solution is heated to 100° C. under a nitrogen atmosphere. At this time the dropwise addition of a solution containing 7 parts of maleic anhydride, 7.5 parts of tribromophenyl acrylate, 5 parts of methyl ethyl ketone and 5 parts of benzene is begun. The addition is continued over a period of 5 hours and agitation is maintained throughout.

The mixture is then transferred to a stainless steel kettle containing 200 parts of methyl ethyl ketone and reacted for a further four hours at 125°–130° C. during which time a solution of 7 parts of maleic anhydride, 7.5 parts of tribromophenylacrylate in 10 parts of methyl ethyl ketone and 10 parts of benzene is added in dropwise fashion.

After completion of the addition, the mixture is reacted for a further half hour and the polymer is precipitated by pouring into cold methanol.

EXAMPLE 2

In this Example the procedure of Example 1 is followed exactly with the substitution of tribromoneopentyl methacrylate for tribromophenyl acrylate.

The molecular weights of tribromophenyl acrylate and tribromoneopentyl methacrylate differ by about 2 percent and so both contain approximately the same percentage of bromine, i.e., about 62 percent by weight.

The rubber used in each Example is Hydrin 100, a polyepichlorohydrin homopolymer available under that commercial designation from B. F. Goodrich Company, which contains 38 percent by weight of chlorine.

The products of Examples 1 and 2 each contain approximately 8.4 percent bromine and 3.8 percent chlorine by weight.

EXAMPLES 3-5

In these Examples the polymer of Example 1 is used to formulate compositions according to the invention and these compositions are evaluated for their fire related properties. The results are set forth in Table II below.

TABLE II
SUMMARY OF EXAMPLES 3 to 5

| Parts by weight of | Ex. 3 | Ex. 4 | Ex. 5 |
|---|---|---|---|
| COMPOSITIONS | | | |
| Polymer of Example 1 | 81 | 69.9 | 67.4 |
| Polybutadiene rubber | 0 | 13.2 | 13.2 |
| Antimony Trioxide | 4 | 4 | 4 |
| Magnesium Carbonate | 10 | 10 | 7.5 |
| Dawsonite | 5 | 0 | 5 |
| Decabromodiphenyl oxide | 0 | 2.9 | 2.9 |
| [Bromine content (percentage) | 6.8 | 8.3 | 8.3] |
| [Chlorine content (percentage) | 3.8 | 3.8 | 3.8] |
| [Total Halogen (percentage) | 10.6 | 12.1 | 12.1] |
| TEST RESULTS | | | |
| UL-94 | V-O | V-O | V-O |
| AFOT (seconds) | 3 | 1 | 2 |
| Dm (Flaming) | 435 | 452 | 469 |
| Dm (Non-flaming) | 253 | 345 | 281 |

It is noted that these samples which all contain a rubber component have substantially better impact properties than the comparable non-rubber-modified copolymers.

It is noted moreover that the addition of the polybutadiene rubber does not adversely affect the flame-retarding properties of the systems.

The polymer compositions of the present invention are useful for preparing a wide variety of molded objects such as radio and television cabinets, appliance housings, parts and components for vehicles, furniture and other related items.

Polymer compositions of the present invention may be further modified with conventional additives and adjuvants such as fillers, plasticizers, U.V. stabilizers, heat stabilizers, anti-oxidants, etc. Care should be taken when formulating or compounding the polymer compositions of the present invention so as not to affect adversely the flammability and/or smoke evolution properties.

What is claimed is:

1. A polymeric molding composition comprising:
(a) from 48 to 94 percent by weight based on the total weight of the molding composition of a rubber modified polymer which is the product of polymerizing:
   (1) from 55 to 85 percent by weight of a styrene monomer;
   (2) from 5 to 25 percent by weight of a maleic anhydride monomer; and
   (3) from 10 to 20 percent by weight of a brominated monomer selected from the group consisting of bromophenyl acrylates, bromophenyl methacrylates, bromoneopentyl acrylate and bromoneopentyl methacrylates with the proviso that the amount of bromine in the polymer is at least 6 percent by weight in the presence of (4) from 1 to 30 percent by weight of a graftable rubber substrate (b) from 3 to 12 percent by weight based on the total weight of the molding composition of a metal oxide;

(c) from 3 to 25 percent by weight based on the total weight of the molding composition of a smoke suppressant which is selected from the group consisting of smoke suppressing hydrates, carbonates and borates; and (d) from 0 to 15 percent by weight of a brominated aromatic fire retardant additive.

2. A composition of matter as in claim 1 wherein the styrene monomer is selected from the group consisting of styrene, alpha-methyl styrene or chlorostyrene.

3. A composition of matter as in claim 1 wherein the brominated monomer contains three bromine atoms.

4. A composition of matter as in claim 1 wherein the brominated monomer is tribromophenyl acrylate.

5. A composition of matter as in claim 1 wherein the brominated monomer is tribromoneopentyl methacrylate.

6. A composition of matter as in claim 1 wherein the metal oxide is antimony oxide.

7. A composition of matter as in claim 1 wherein the smoke suppressant is selected from the group consisting of magnesium carbonate, dawsonite and mixtures thereof wherein the ratio of magnesium carbonate to dawsonite is at least 1:1.

8. A composition of matter as in claim 1 which further contains from 3 to 12 percent by weight of a brominated aromatic fire retardant additive.

9. A composition of matter as in claim 1 wherein the rubber is a chlorinated rubber selected from the group consisting of polyepichlorohydrin, polychloroprene and chlorinated polyethylene rubbers.

10. A composition of matter comprising:

(a) from 61 to 90 percent by weight based on the total weight of the molding composition of a rubber modified polymer which is the product of polymerizing:

(1) from 60 to 83 percent by weight of a styrene monomer selected from the group consisting of styrene, alpha-methyl styrene or chlorostyrene and mixtures thereof;

(2) from 7 to 20 percent by weight of a maleic anhydride monomer; and (3) from 10 to 20 percent by weight of a brominated monomer selected from the group consisting of tribromophenyl acrylate, tribromophenyl methacrylate, tribromoneopentyl acrylate, tribromoneopentyl methacrylate with the proviso that the amount of bromine in the polymer is at least 6 percent by weight in the presence of (4) from 5 to 20 percent by weight of a rubber selected from the group consisting of polyepichlorohydrin, polychloroprene and chlorinated polyethylene rubbers;

(b) from 4 to 12 percent by weight based on the total weight of the molding composition of brominated aromatic fire retardant additive;

(c) from 3 to 12 percent by weight based on the total weight of the molding composition of antimony oxide; and (d) from 3 to 25 percent by weight based on the total weight of the molding composition of a smoke suppressant which is selected from the group consisting of magnesium carbonate, dawsonite and mixtures thereof wherein the ratio of magnesium carbonate to dawsonite is at least 1:1.

* * * * *